Figure 1:
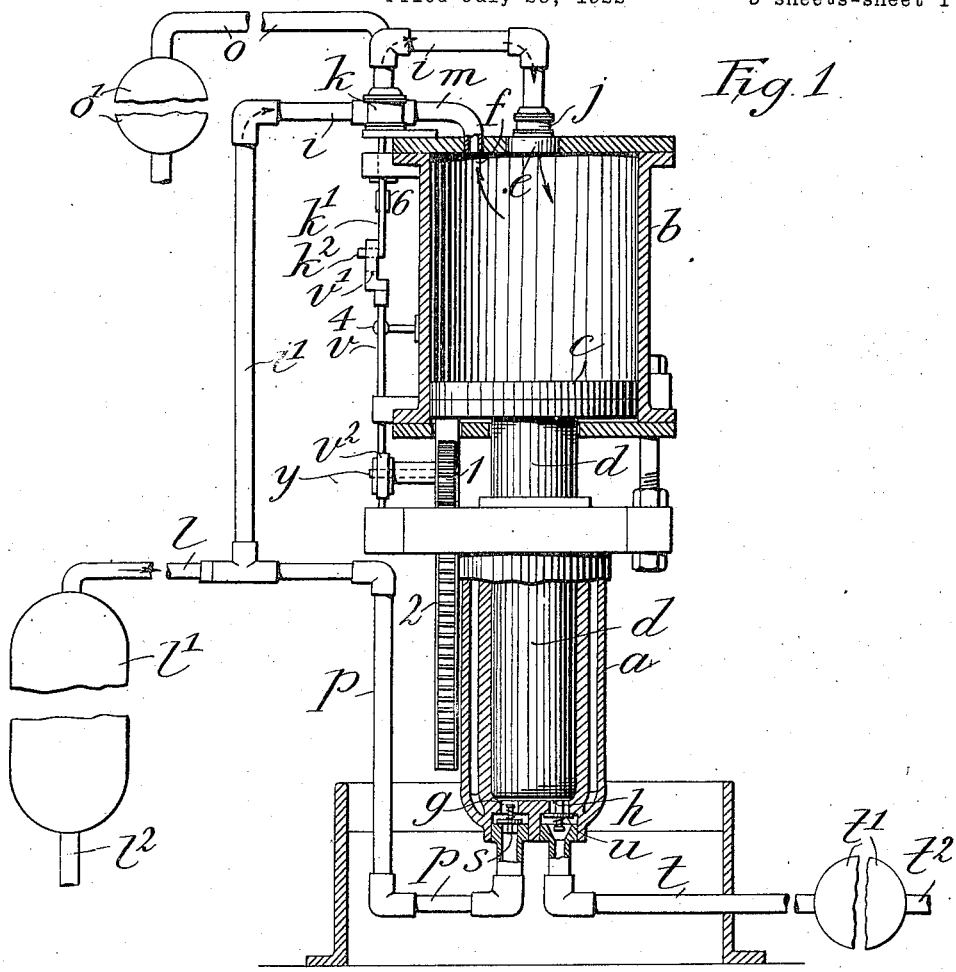

Apr. 10, 1923. 1,451,303

E. A. MITCHELL

GAS DISTRIBUTING SYSTEM

Filed July 26, 1922 3 sheets-sheet 1

Edward Albert Mitchell
By Julian C. Dowell
his attorney.

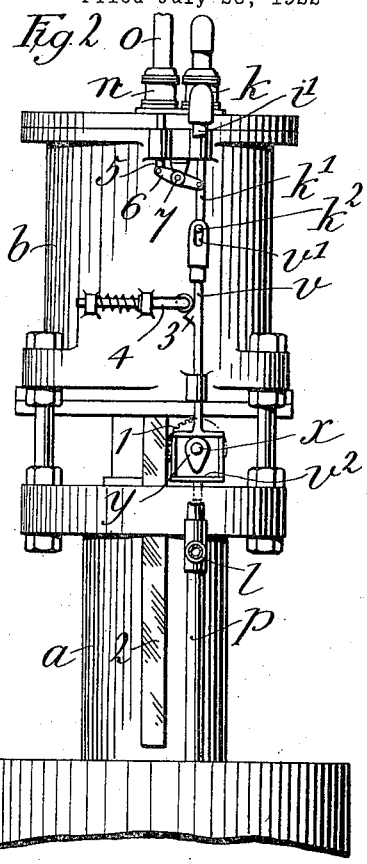
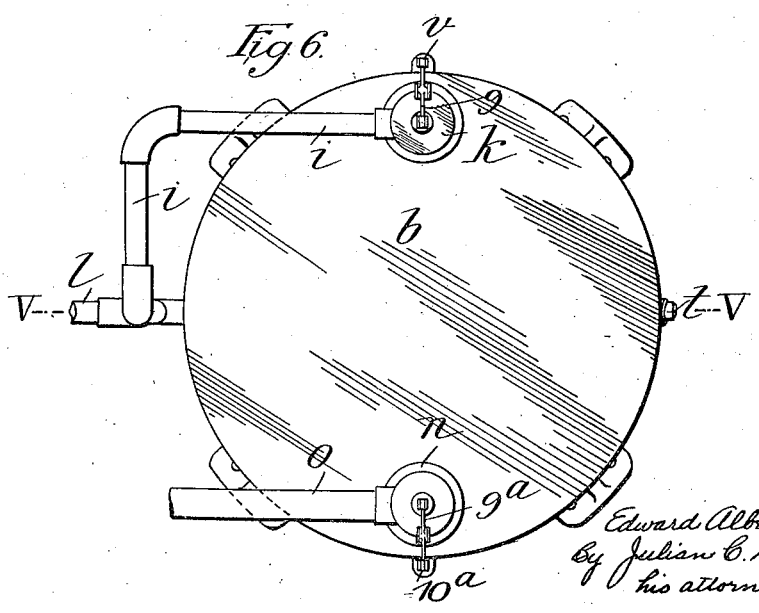

Apr. 10, 1923.

E. A. MITCHELL 1,451,303

GAS DISTRIBUTING SYSTEM

Filed July 26, 1922

3 sheets-sheet 3

Edward Albert Mitchell
By Julian C. Dowell
his attorney.

Patented Apr. 10, 1923.

1,451,303

UNITED STATES PATENT OFFICE.

EDWARD ALBERT MITCHELL, OF LONDON, ENGLAND.

GAS-DISTRIBUTING SYSTEM.

Application filed July 26, 1922. Serial No. 577,673.

*To all whom it may concern:*

Be it known that I, EDWARD ALBERT MITCHELL, a subject of the King of Great Britain and Ireland, residing at London, England, have invented Improvements in or Relating to Gas-Distributing Systems (for which I have filed an application in Great Britain dated Mar. 24, 1921, #9,160 and an application in France dated Mar. 28, 1922, #157,343), of which the following is a specification.

This invention relates to gas distributing systems, wherein combustible gas is supplied under high pressure to a pipe line by which it is to be conducted from the generating station to a distributing station at a considerable distance therefrom.

In such cases, it is usual to compress the gas at the generating station to a high pressure and to conduct it through a pipe of comparatively small bore to the distributing station. With such an arrangement, the terminal pressure is very much lower than the initial pressure. For instance, assuming the generating and distributing stations are many miles apart, say twenty miles, the gas, owing to the friction of the pipe line, may fall from an initial pressure of say for example fifty pounds to the square inch to a terminal pressure of say for example ten pounds to the square inch. If it be desired to conduct part of the gas from the distributing station to another distributing station at a considerable distance from the first one, it will be necessary, in order not to increase the initial pressure of the gas, or to use a pipe line of larger bore, to instal at the first distributing station, means for raising or boosting the pressure of the gas received at that station, in order that it may be transmitted to the second distributing station at a pressure suitable for use.

Now the present invention has for its object to enable this result to be attained in a simple and economical manner.

For this purpose, there are provided for use at the first distributing station, means whereby part of the gas received at low pressure at that distributing station can be raised in pressure by the remainder of the low pressure gas, or part thereof, and transmitted through a second pipe line to a second distributing station. The low pressure gas thus utilized as motive fluid for compressing the remaining low pressure gas to a suitably high pressure, can, after such use, be distributed at a suitably further reduced pressure, say for example to three fourths of a pound to the square inch, to gas users in the district or zone supplied from the first distributing station.

For carrying out the invention there may be provided for use at the first distributing station, a gas compressing plant comprising two cylinders, hereinafter called for distinction $a$ and $b$, of different diameters and each provided with a piston or plunger and with valve controlled inlet and outlet pipes or branches. Cylinder $a$ is of less diameter than cylinder $b$, and its piston or plunger is operated from the piston or plunger of cylinder $b$.

At the distributing station there are also provided gas reservoirs or containers. The low pressure gas inlet of each cylinder is adapted to be connected through its valve controlled pipe to the pipe line coming from the generating station, or to a gas reservoir or container into which gas is delivered from the said pipe line. The gas outlet of cylinder $a$ is connected through its valve controlled pipe to a compressed gas reservoir from which extends a second pipe line to a second distributing station. The gas outlet from cylinder $b$ is connected through its valve controlled pipe to a low pressure gas distributing reservoir from which gas at lower pressure than that delivered by the first pipe line can be distributed to gas users in the district or zone served by the distributing station.

The arrangement is such that assuming the two pistons are at the end of their return strokes, the gas inlet and outlet valves of cylinder $a$ are respectively open and closed so that such cylinder will have been charged with gas from the first pipe line, or the reservoir connected thereto, and that the gas inlet and outlet valves of cylinder $b$ are respectively closed and open, then upon the outlet valve of cylinder $b$ being closed and the inlet valve of that cylinder opened and the inlet valve of cylinder $a$ being closed and the outlet valve of that cylinder opened, low pressure gas will flow into cylinder $b$ and cause its piston to make its working stroke. The piston of cylinder $a$ will thereby be caused to travel and compress the low pressure gas therein to a fresh initial high pressure and force it into the high pressure gas reservoir whence it passes to the second pipe line. Upon the gas inlet and outlet valves of cylinder $b$ being respectively closed and opened and the inlet and outlet valves of cylinder $a$ being respectively opened and closed, gas at low pressure will again pass from the first pipe line, or associated gas reservoir, into cylinder $a$ and cause the pistons or plungers of both cylinders to make their return strokes and displace the spent gas from cylinder $b$ through the gas outlet from that cylinder into the low pressure reservoir associated with that cylinder and wherein the pressure is less than the terminal pressure of the first pipe line. From the last mentioned reservoir, gas can be supplied to the district or zone consumers at a suitably lower pressure than the pipe line terminal pressure. The terminal pressure may, for example, be of the order of ten pounds to the square inch and the district or zone pressure may be say three fourths of a pound to the square inch. The valves can then be reversed so as to cause the piston in cylinder $b$ to again make its working stroke to compress and force a further quantity of gas from cylinder $a$ into the high pressure gas reservoir. The valves of cylinder $b$ may suitably be interconnected to enable them to be worked at the required times and in the required manner from suitable operating means.

In order that the pistons or plungers of the two cylinders $a$ and $b$ may work automatically and independently of any external operating means requiring to be independently driven, there may be associated with the piston of cylinder $b$, means for operating or controlling, at the required times, the gas inlet valve of cylinder $b$ and also, the gas outlet valve of cylinder $b$. Such valve operating means may be constituted by cam, lever or equivalent mechanism. Or the inlet and outlet valves of cylinder $b$ may be interconnected and positively operated, and the inlet and outlet valves of cylinder $a$ be automatic non-return valves.

Figure 3:
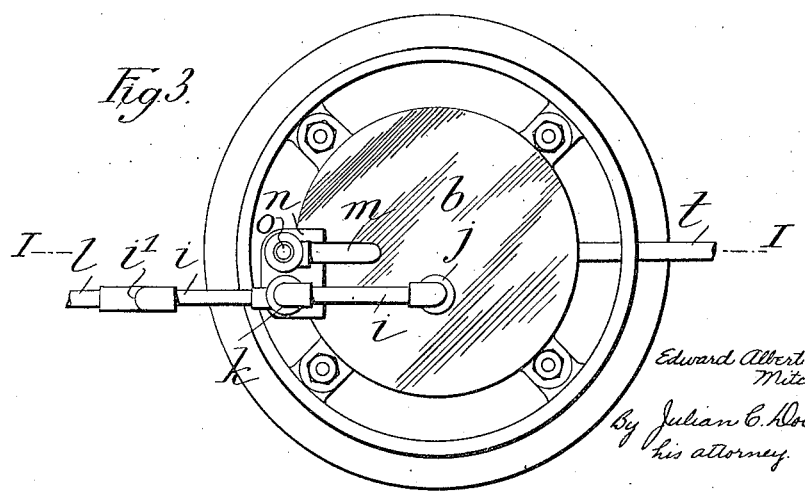
Figure 4:
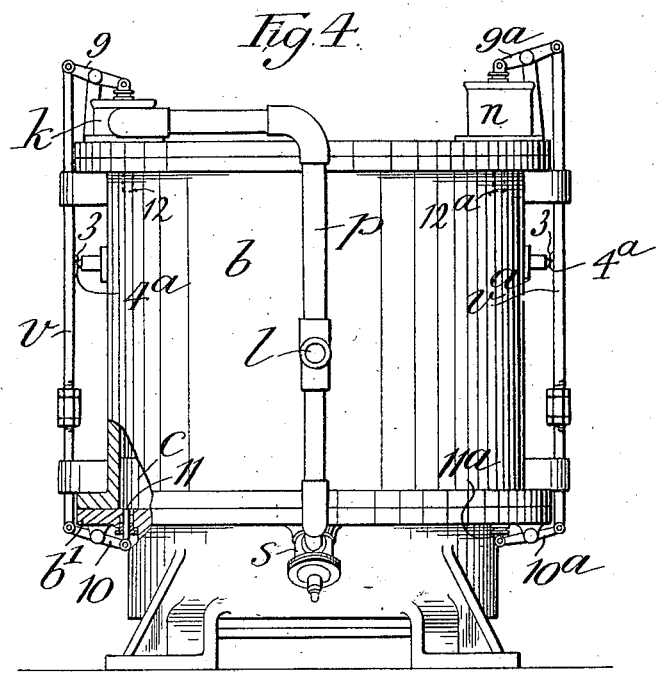
Figure 5:
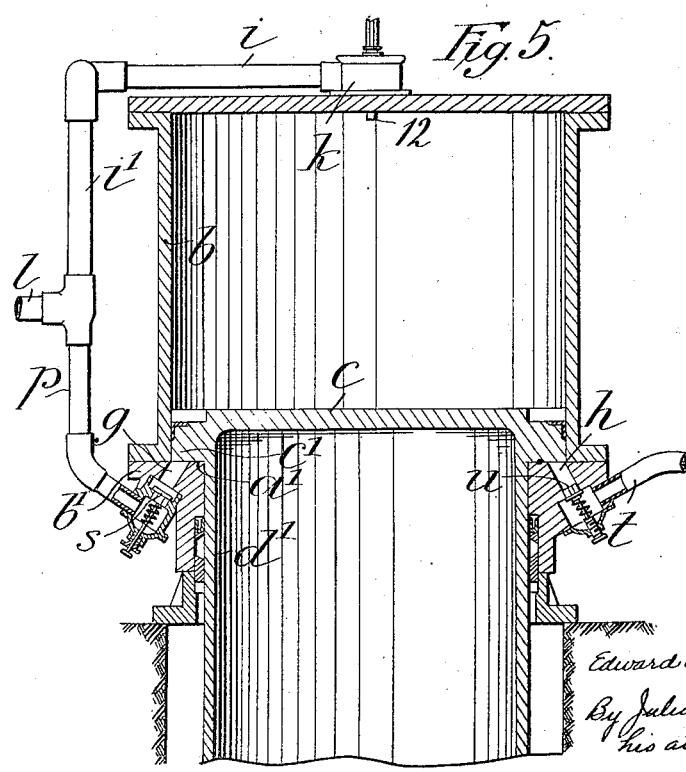

In the accompanying illustrative drawings, Fig. 1 shows partly in vertical section on the line I—I of Fig. 3 and partly in side elevation, Fig. 2 in elevation at right angles to Fig. 1 and Fig. 3 in plan, one construction of gas compressing plant according to the invention, arranged at the first distributing station. Fig. 4 shows partly in side elevation and partly in vertical section; Fig. 5 partly in vertical section on the line V—V of Fig. 6 and partly in side elevation and Fig. 6 in plan, a modified arrangement.

In the example shown in Figs. 1, 2, and 3, $a$ and $b$ are two cylinders arranged one below the other, $b$ being of larger diameter than $a$, and fitted with a piston $c$ connected to a plunger $d$ of smaller diameter arranged to work in cylinder $a$. Cylinder $b$ is provided with a low pressure gas inlet at $e$ and with a gas outlet $f$, and cylinder $a$ is provided with a low pressure gas inlet $g$ and with a high pressure gas outlet $h$. The gas inlet $e$ of cylinder $b$ is connected by a pipe $i$ $i^1$, provided with an inlet valve $k$, to a low pressure gas supply pipe $l$ connected either directly, or, as shown, indirectly through a reservoir $l^1$ to the pipe line $l^2$ coming from a gas generating station at a distance. The pipe $i$ may also, if desired, be provided with a spring controlled non-return valve $j$. The gas outlet $f$ is connected by a pipe $m$, provided with an exhaust outlet valve $n$, to an exhaust pipe $o$ connected to a low pressure gas reservoir $o^1$ from which consumers served from the said distributing station can receive a supply of gas at lower pressure than that supplied to the gas compressing plant from the pipe line $l^2$. The low pressure gas inlet $g$ of cylinder $a$ is connected to the low pressure gas supply pipe $l$ by a pipe $p$, provided with a spring controlled non-return valve $s$. The high pressure gas outlet $h$ is connected by a pipe $t$, provided with a spring controlled non-return valve $u$, either directly, or as shown, indirectly through a high pressure gas reservoir $t^1$ to a second pipe line $t^2$ extending to another distributing station at a distance from the first one. The gas inlet valve $k$ and gas outlet valve $n$ are arranged to be opened and closed by movement derived from the piston $c$. In the example now being described, the valve $k$ has a stem $k^1$ provided with a cross pin $k^2$ extending into a slot $v^1$ in the upper end of a rod $v$, the lower end of the rod being provided with a rectangular frame $v^2$ within which works a cam $x$. This cam is fixed on a spindle $y$ to which is fixed a toothed wheel 1 in gear with a vertical rack 2 connected to the piston $c$. The valve rod $v$ is provided with a wedge shape projection 3 against which acts a spring bolt 4. The gas outlet or exhaust valve $n$ has a stem 5 which is interconnected with the valve rod $v$ by a lever 6 pivoted at 7. The bottom of cylinder $b$, is in this example, open to the external atmosphere.

The operation of the gas compressing plant just described will generally be understood from what has already been stated but may be further briefly described as follows:—With the parts in the position shown in Figs. 1 and 2, low pressure gas from the pipe line $l^2$ will have been admitted to the top of the cylinder $b$ through the pipes $l$, $i^1$, $i$ and open inlet valve $k$ and port $e$ and caused the piston $c$ in that cylinder to have made its downstroke and caused the plunger $d$ to have made its downstroke and compressed the gas previously admitted to the cylinder $a$ from the low pressure gas supply pipe $l$, through the pipe $p$, non-return valve $s$ and gas inlet $g$, and forced it through the outlet valve $u$ and pipe $t$ to the second pipe line $t^2$, either directly, or through the low pressure gas reservoir $t^1$ if this reservoir be used. During the descent of the piston and plunger, the rack 2 will have rotated the cam $x$ and, through the frame $y^2$, will have moved the valve rod $v$ downward independently of the valve stem $k^1$ and caused the wedge shaped projection 3 to store energy in the spring associated with the bolt 4 until the centre of the said projection 3 comes just below the centre of pressure of the spring bolt, whereupon the bolt will act to suddenly move the valve rod downward to a sufficient extent to close the gas inlet valve $k$ and simultaneously open the gas outlet or exhaust valve $n$ by the action of the lever 6 and place the cylinder $b$ in communication with the low pressure gas outlet pipe $o$. As the gas pressure above the piston $c$ will now fall considerably below the pressure in the low pressure gas supply pipe $l$, gas from that pipe will flow through the pipe $p$, past the non-return inlet valve $s$ and through the gas inlet $g$ into the lower end of cylinder $a$ and cause the plunger $d$ and piston $c$ to make their upward or return stroke, the spent gas above piston $c$ being thereby displaced through the outlet $f$, exhaust pipe $m$, open exhaust valve $n$ and exhaust pipe $o$ into the low pressure gas reservoir $o^1$. From this reservoir, the pressure within which will be much lower than that of the low pressure gas delivered into cylinder $b$ from pipe $l$, gas can be delivered to consumers in the district or zone to be served by the distributing station. When the piston $c$ and plunger $d$ nearly reach the end of their upstroke, the rack 2 will have rotated the cam $x$ into a position in which it will have raised the valve rod $v$ independently of the stem $k^1$ of the inlet valve $k$ and moved the centre of the wedge shaped projection 3 just above the centre of pressure of the spring bolt 4, whereupon the bolt will react, under the energy previously stored in its spring, and rapidly raise the valve rod to a further extent and open the gas inlet valve $k$ and close the gas exhaust valve $n$. Low pressure gas will then again enter the upper end of the cylinder $b$ and cause the piston $c$ and plunger $d$ to make their next downstroke and compress the gas in cylinder $a$ through the gas outlet $h$, past the non-return valve $u$ and through the outlet pipe $t$ to the second pipe line $t^2$. As will be readily understood the above described operations will take place automatically.

In the modified arrangement shown in Figs. 4, 5 and 6, the piston $c$ of the larger cylinder $b$ is provided with a tubular plunger $d^1$ that works in a gas tight manner through an opening in the bottom cover $b^1$ of the cylinder so that when piston $c$ and plunger $d^1$ rise, an annular gas space will be formed at $a^1$ between the cylinder $b$, the plunger $d^1$ the outer annular portion $c^1$ of the piston $c$ and the cover $b^1$, these parts forming a cylinder of smaller cross sectional area than that of cylinder $b$. The annular portion $c^1$ of piston $c$ forms the piston for such cylinder. The ratio between the cross sectional areas of the two cylinders $b$ and $a^1$ will be made inversely proportional to that of the pressure of the low pressure gas delivered to the large cylinder and that of the gas to be delivered from the cylinder or space $a^1$.

The gas inlet valve $k$ of cylinder $b$ is in this case arranged to be closed by the raising of a rod $v$ which is connected at its upper end, as by a lever 9, to the valve, and at its lower end, by a lever 10, to a pin 11 projecting into the smaller cylinder or space $a^1$, the pin being depressed and the valve closed by the piston just before the latter reaches the bottom of its stroke. The gas valve $k$ is opened, when the piston nearly reaches the end of its upstroke, by causing the piston $c$ to strike against a pin 12 connected to the said valve and projecting into the top of the cylinder $b$. The gas outlet or exhaust valve $n$ is opened and closed by similar rod, lever and pin mechanism $v^a$, $9^a$, $10^a$, $11^a$, $12^a$ actuated by the piston $c$ just before it completes its downward and upward strokes respectively. Low pressure gas is supplied automatically to the smaller cylinder or gas space $a^1$ from the gas supply pipe $l$ through a pipe $p$ non-return valve $s$ and gas inlet port $g$, when the gas outlet or exhaust valve $n$ is opened, to cause the piston $c$ and plunger $d^1$ to rise and permit the said smaller cylinder or gas space $a^1$ to be filled with low pressure gas, such gas being compressed and forced through the outlet $h$, past the non-return valve $u$ and through the pipe $t$ to the high pressure reservoir and second pipe line, when the gas inlet valve $k$ is opened and the gas outlet valve $n$ closed, in a similar manner to that hereinbefore described with reference to Figs. 1, 2 and 3. Each valve rod $v$, $v^a$ may be temporarily held in the position into which it is moved by the piston $c$, by means of a spring stop $4^a$ arranged to act against one or other side of a projection 3 on the rod.

Valve operating mechanism constructed and operating in the manner shown in and described with reference to Figs. 4, 5 and 6 may be used in the arrangement of apparatus shown in Figs. 1, 2 and 3 in lieu of that shown in such figures.

What I claim is:—

1. In a gas distributing system, the combination with a medium pressure reservoir, a low pressure reservoir and a high pressure reservoir, of a fluid actuated pump comprising a space for actuating fluid and a space for pumped fluid and piston means cooperating with said spaces having a greater area exposed to fluid pressure in the space for actuating fluid and a smaller area exposed to fluid pressure in the space for pumped fluid, a valved inlet connection leading to said space for actuating fluid from the medium pressure reservoir, a valved outlet connection leading from the last mentioned space to the low pressure reservoir, a valved inlet connection leading to said space for pumped fluid from the medium pressure reservoir, and a valved outlet connection leading from the last mentioned space to the high pressure reservoir.

2. The combination, in a gas distributing system, with means for supplying a distant distributing station with gas under low pressure, of a low pressure reservoir at said station and means for filling said reservoir with gas of low pressure and simultaneously raising the pressure of a part of the gas received at said station and transmitting it to another station; the latter means comprising cylinder mechanism having a gas receiving space of comparatively large area and a gas receiving space of smaller area, a fluid-pressure-actuated piston in said space of larger area and means associated therewith for compressing gas in said space of smaller area, low pressure gas supply and exhaust pipes connecting said space of larger area with said source of supply and said low pressure reservoir respectively, inlet and outlet valves for controlling said supply and exhaust pipes respectively, low pressure gas supply and high pressure delivery pipes respectively, connected to said space of smaller area, and automatic non-return inlet and outlet valves for controlling the two last mentioned pipes.

3. A gas compressing plant comprising a cylinder, a piston therein, gas inlet and outlet pipes connected to one end of said cylinder, inlet and outlet valves in the respective pipes, a cover fixed to the opposite end of said cylinder and provided with gas inlet and outlet ports, a cylindrical plunger connected to, co-axial with and of smaller diameter than said piston and extending in a fluid tight manner through said cover, so that the outer annular portion of the piston between the cylinder wall and plunger forms a secondary and smaller piston and the annular space formed between the secondary piston and cylinder cover and the wall of the cylinder and plunger, during the working of the combined pistons, forms a cylindrical chamber in which gas admitted thereto can be compressed by said secondary piston, means under the control of said combined pistons for opening and closing the said inlet and outlet valves, a gas inlet pipe connected to the inlet port in said cylinder cover, a valve controlling said inlet pipe, a compressed gas outlet pipe connected to the outlet port of said cylinder cover and a valve controlling said outlet pipe.

4. A gas compressing plant comprising a cylinder, a piston therein, gas inlet and outlet pipes connected to one end of said cylinder, inlet and outlet valves in the respective pipes, each having a stem extending into said cylinder and into the path of said piston, a cover fixed to the opposite end of said cylinder and provided with inlet and outlet ports, a plunger coaxial with, connected to and of smaller diameter than said piston and extending in a fluid tight manner through said cover, pins extending through said cover into the cylinder and into the path of said piston, rod and lever mechanism connecting each pin to one of the said valves, gas inlet and outlet pipes connected respectively to the gas inlet and outlet ports in said cover and automatic non-return inlet and outlet valves in the last mentioned gas inlet and outlet pipes respectively.

5. In a gas distributing system of the kind herein referred to comprising a pipe line, a gas compressing plant comprising a vertical cylinder, a gas supply pipe connected to said pipe line, a cylinder having gas inlet and outlet ports at one end, a gas inlet pipe connecting said gas supply pipe to said inlet port, a gas outlet pipe connected to said outlet port, gas inlet and outlet valves in said gas inlet and outlet pipes respectively, a cover secured to the opposite end of said cylinder and provided with gas inlet and outlet ports, a plunger coaxial with, connected to and of smaller diameter than said piston and extending in a fluid tight manner through said cover, means actuated by said piston for closing and opening said gas inlet valve when the piston is nearing the end of its downward and upward strokes respectively, means actuated by said piston for opening and closing said outlet valve when the piston is nearing the end of its downward and upward strokes respectively, a gas inlet pipe connecting said gas supply pipe to the gas inlet port in said cover, a compressed gas delivery pipe connected to the gas outlet pipe in said cover, and automatic non-return valves in the last mentioned gas inlet and outlet pipes.

Signed at American consul general, London, 14 day of July, 1922.

EDWARD ALBERT MITCHELL.